May 9, 1939.  P. E. CHAPMAN  2,157,847

DESPOOLER

Filed Feb. 17, 1937

Inventor
Penrose E Chapman

UNITED STATES PATENT OFFICE 2,157,847

DESPOOLER

Penrose E. Chapman, St. Louis, Mo.

Application February 17, 1937, Serial No. 126,155

5 Claims. (Cl. 242—128)

The object of my invention is a device for taking wire off of spools that shall permit of a high rate of acceleration, running, and deceleration, combined with uniform tension.

When these speeds are high the variables inertia, windage, and deceleration become the limiting factors.

This invention applies to the over the head type of despoolers in which it is customary to apply a nominally fixed braking action which still further adds to the effect of inertia and windage and is none too strong to overcome momentum. The action of "fixed" brakes also varies.

In this invention I cause the pull on the delivered wire to vary the braking action oppositely to that of the said variables and thereby to a large extent compensate therefor, making it possible to start, run and stop faster and at the same time hold a reasonably uniform tension as is more fully set forth hereinafter.

The term, wire, for brevity is taken to include all forms of elongated material, such as thread, string, ribbon, wire, and the like and the term, spool, is used to include any form of package in which the said wire may be wound, as on spools, reels, kopts, self-supporting coils, unsupported coils, and the like.

In the drawing

Figure 1:
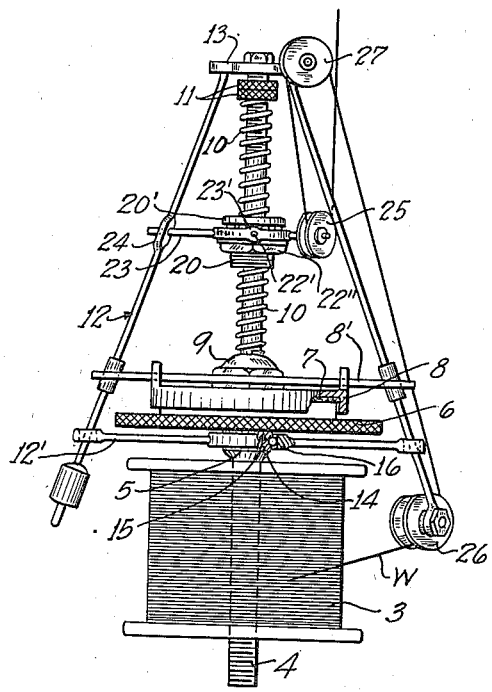
Fig. 1 is a general elevation of my improved despooler.

In the drawing 3 is a spool from which the wire $w$ is to be taken that may be held in position by any suitable means, such as the bevel headed threaded spindle 4. A spindle 5 which may be an extension of spindle 4 is provided. Any convenient braking system may be used but I prefer to use disc brakes. It is convenient to make such a brake by attaching stationary brake disc 6 to the spindle 5, providing rotating brake disc 8, interposing brake lining 7 therebetween. Pressure may be applied to said rotating disc 8, by the spring 10, which acts through thrust bearing 9, said bearing permitting said disc to rotate while the spring stands still.

The tension on the said spring 10 is adjusted by nuts 11.

The wire is taken off of the spool 3 by a conventional A pattern flyer 12 which drives disc 8 through a loose coupling as cross bar 8'. Bearings 13 and 14 support said flyer 12. As the flyer 12 must be of very light construction, operating strains will spring it out of line so that an ordinary bearing at 14 would cramp and bind. To overcome this difficulty and keep the weight of the bearing light I prefer to use a ball bearing with a conventional inner race 15 but whose outer race 16 is a straight cylindrical one formed as an integral part of the cross member 12' thus forming a self-aligning bearing.

The position of said cross member 12' is very important in attaining high speed. I therefore place it next the spool 3.

In order to automatically vary the braking action I adjust the tension on the spring 10 against the braking elements by attaching a crosshead 20 to said spring at some point between its ends, this point being hereinafter referred to as a central one.

Figure 2:
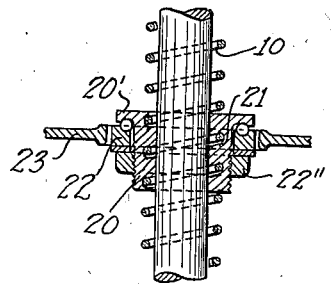
Fig. 2 is a cross section of the regulating crosshead.

An excellent means of attaching said crosshead 20 to said spring 10 is shown in the section Fig. 2 that discloses a thread 21 cut on the interior thereof. This thread is made to fit over the spring 10 and also to extend through the said spring so that the land of the thread may play against the spindle 5 for preserving alignment. The spring 10 may be in two pieces with crosshead between but I prefer the one piece construction above and in this connection I use the word spring to cover either construction.

On the outside of the crosshead 20 I provide a pair of thrust bearings as on the faces of the flange 20' and the nut 22''.

Between the said thrust bearing surfaces I prefer to mount a gimbal yoke or ring 22. Trunnions 22' of this gimbal ring are in turn mounted in the bearings 23' on the regulating lever 23 which floats with the crosshead 20. The fulcrum end of this lever is loosely secured to the flyer 12 by passing it through the eyelet 24 thereon.

The other end of this regulating lever carries any convenient wire directing device as a lappet or a pulley 25. In order that the despooling wire may actuate the regulating lever it is convenient to use block and tackle elements. Lappets may be used for directing the wire $w$ but I prefer to use pulleys, as pulley 27, fastened to the top of the flyer being the fixed one and the pulley 25 attached to the regulating lever 23 being the movable one. Wire $w$ is used for the tackle.

In operation the wire $w$ is passed from the spool 3 over pulley 26 carried by one end of the flyer 12, thence over the directioning pulley 27 carried by the upper bearing end of said flyer 12, down over pulley 25 on said regulating lever and thence off. It is obvious that when a pull is applied to wire $w$ it will act through pulley 25, lever 23, gimbal ring 22 and crosshead 20 to pull up the spring 10 removing some or all of the tension of said spring against the brake disc 8 thereby adjusting said brake to deliver a desired tension. When inertia, windage or other action causing increased drag is present said drag causes a still further release of said tension to compensate therefor. At stopping, momentum is compensated for by reverse action.

Other variables as the diameter of the spool, variations in the demand for wire, etc., are similarly compensated for.

There are many variations that can be made of this invention without departing from the spirit thereof. I therefore do not limit myself to the exact form shown. I wish to claim:

1. In a despooling device the combination of a flyer, braking elements therefor, a spring actuating said braking elements with means for centrally attaching said spring to the wire being despooled by said device, the pull of said wire actuating said spring.

2. In a despooling device the combination of a flyer, braking elements therefor, a spring, actuating said braking elements, a crosshead and regulating lever, coupled to said spring, with block and tackle elements coupling said regulating lever to said flyer.

3. In a despooling device the combination of means for holding a spool in position, a flyer for taking the wire off of said spool, a supporting spindle supporting said flyer, a brake, for applying a drag to said flyer, a spring, concentrically mounted over said spindle for applying a pressure to said brake, a crosshead movably mounted on said spindle and coupled to said spring, a gimbal thrust collar revolvably carried by said crosshead, a regulating lever attached by trunnion bearings to said gimbal collar, the fulcrum end of said lever being coupled to said flyer, a wire directing device carried by the working end of said lever over which wire from said spool may pass.

4. In a despooling device the combination of a tensioning spring, a regulating crosshead and a guiding spindle, means for coupling said regulating crosshead to said tensioning spring and guiding said crosshead consisting of deeply threading the inside of said crosshead to fit over said regulating spring and of making said threads extend through said spring to engage said guiding spindle.

5. In an over the head despooler the combination of an A pattern flyer having a cross member, a cylindrical bearing formed integral with said cross member, a set of balls, and a ball race therefor, said cylindrical bearing riding on said balls and race to produce a self-aligning bearing for the said flyer.

PENROSE E. CHAPMAN.